(12) United States Patent
Park et al.

(10) Patent No.: US 9,017,879 B2
(45) Date of Patent: Apr. 28, 2015

(54) ELECTROLYTE HAVING EUTECTIC MIXTURE AND ELECTROCHEMICAL DEVICE CONTAINING THE SAME

(75) Inventors: Ji-Won Park, Daejeon (KR); Byoung-Bae Lee, Chungcheongnam-do (KR); Jae-Seung Oh, Seoul (KR); Shin-Jung Choi, Jeonbuk (KR); Jae-Duk Park, Daejeon (KR); Dong-Su Kim, Daejeon (KR); Hyo-Jin Lee, Daejeon (KR)

(73) Assignee: LG Chem, Ltd. (KR)

( * ) Notice: Subject to any disclaimer, the term of this patent is extended or adjusted under 35 U.S.C. 154(b) by 822 days.

(21) Appl. No.: 12/813,000

(22) PCT Filed: Jan. 9, 2009

(86) PCT No.: PCT/KR2009/000128
§ 371 (c)(1),
(2), (4) Date: Sep. 7, 2010

(87) PCT Pub. No.: WO2009/091159
PCT Pub. Date: Jul. 23, 2009

(65) Prior Publication Data
US 2011/0014523 A1    Jan. 20, 2011

(30) Foreign Application Priority Data

Jan. 16, 2008   (KR) .................. 10-2008-0004866

(51) Int. Cl.
*H01M 10/0564*   (2010.01)
*H01M 10/0525*   (2010.01)

(52) U.S. Cl.
CPC ...... *H01M 10/0564* (2013.01); *H01M 10/0525* (2013.01); *H01M 2300/0085* (2013.01); *H01M 2300/0091* (2013.01); *Y02E 60/122* (2013.01)

(58) Field of Classification Search
USPC .......... 429/303, 302, 188, 199, 207; 252/62.2
See application file for complete search history.

(56) References Cited

U.S. PATENT DOCUMENTS

| 2006/0121355 A1 | 6/2006 | Kolosnitsyn et al. |
| 2007/0042266 A1 | 2/2007 | Oh et al. |
| 2007/0099090 A1 | 5/2007 | Oh et al. |

FOREIGN PATENT DOCUMENTS

| JP | 11-067265 A | 3/1999 | |
| JP | 2000-348760 | * 12/2000 | ............ H01M 10/40 |
| JP | 2000-348760 A | 12/2000 | |
| JP | 2002-110225 A | 4/2002 | |
| KR | 20070021962 | 2/2007 | |
| KR | 20070045975 A | 5/2007 | |
| KR | 20070085575 A | 8/2007 | |

OTHER PUBLICATIONS

International Search Report, PCT/KR2009/000128, dated Aug. 20, 2009.

* cited by examiner

*Primary Examiner* — Raymond Alejandro
(74) *Attorney, Agent, or Firm* — Lerner, David, Littenberg, Krumholz & Mentlik, LLP

(57) ABSTRACT

An electrolyte includes a eutectic mixture comprising (a) an alkoxy alkyl group-containing amide compound having a specific chemistry formula 1 or 2:

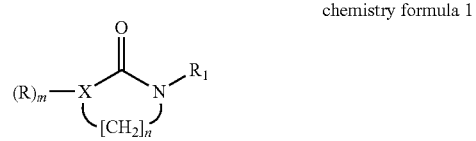

chemistry formula 1

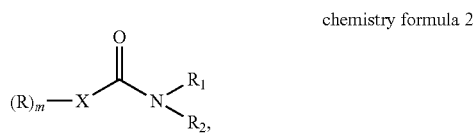
chemistry formula 2 wherein each of X, R, R1, R2, m and n is defined;
and (b) an ionizable lithium salt. The eutectic mixture-containing electrolyte exhibits excellent high temperature stability as well as inherent characteristics of eutectic mixtures, including excellent thermal and chemical stability, thus contributing to improved high temperature stability and decreased lowest limit of electrochemical window. The electrolyte is useful in electrochemical devices comprising various anode materials.

14 Claims, 1 Drawing Sheet

ELECTROLYTE HAVING EUTECTIC MIXTURE AND ELECTROCHEMICAL DEVICE CONTAINING THE SAME

CROSS REFERENCE TO RELATED APPLICATIONS

The present application is a national phase entry under 35 U.S.C. §371 of International Application No. PCT/KR2009/000128, filed Jan. 9, 2009, published in English, which claims priority from Korean Patent Application No. 10-2008-0004866, filed Jan. 16, 2008. The disclosures of said applications are incorporated by reference herein.

TECHNICAL FIELD

The present invention relates to an electrolyte having a eutectic mixture and an electrochemical device containing the same.

BACKGROUND ART

Various kinds of electrolytes are recently used for many electrochemical devices such as lithium secondary batteries, electrolytic condensers, electric double-layer capacitors, electrochromic display devices, and dye-sensitized solar cells that are currently studied in various ways for further usage, and the importance on electrolytes is increased day by day.

In recent, the most frequently used electrolytes are non-aqueous electrolytes obtained by dissolving ionizable salts such as lithium salt in organic solvents such as ethylene carbonate, propylene carbonate, dimethoxy ethane, γ-butyrolactone (GBL), N,N-dimethyl formamide, tetrahydrofurane and acetonitrile.

However, the organic solvents used for such a non-aqueous electrolyte exhibit easy leakage due to low viscosity and they may be vaporized due to very strong volatility. Also, these organic solvents exhibit strong flammability. Accordingly, an electrochemical device having such an organic solvent shows problems in durability and stability.

In order to solve this problem, there has been proposed a method of using an imidazolium-based or ammonium-based ionic liquid as an electrolyte of a lithium secondary battery. However, such an ionic liquid may be reduced at a higher voltage than lithium ions in an anode, or imidazolium or ammonium cations may be inserted into the anode together with lithium ion, which rather deteriorates the battery performance.

Meanwhile, Korean Patent Registration No. 10-751203 and Korean Laid-open Patent Publication No. 10-2007-85575 disclose eutectic mixtures of lithium salt and amide compound such as acetamide, urea, methylurea, caprolactam, valerolactam, trifluoroacetamide, carbamate and formamide, expressed as predetermined chemistry figures, as an electrolyte. Such eutectic mixtures exhibit high thermal and chemical stabilities as well as relatively wide electrochemical window, so they solve the problems such as evaporation or ignition of electrolyte caused by the usage of the existing organic solvents.

Accordingly, the development of various eutectic mixtures as electrolyte is accelerated. In particular, there is an increased demand on eutectic mixture electrolytes having better high temperature stability and a smaller lowest limit of an electrochemical window for the use in electrochemical devices requiring various electrochemical characteristics.

DISCLOSURE OF INVENTION

Technical Problem

Therefore, it is an object of the present invention to provide an electrolyte having a new eutectic mixture exhibiting high thermal and chemical stabilities, and an electrochemical device containing the same.

Another object of the present invention is to provide an electrolyte having an eutectic mixture exhibiting a smaller lowest limit of an electrochemical window as well as better high temperature stability, and an electrochemical device containing the same.

Technical Solution

In one aspect of the present invention, there is provided an electrolyte, which includes a eutectic mixture composed of (a) an alkoxy alkyl group-containing amide compound expressed by the following chemistry formula 1 or 2; and (b) an ionizable lithium salt.

Chemistry Figure 1

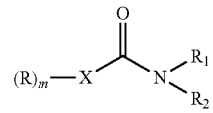

where R, $R_1$ and $R_2$ are hydrogen, halogen or any one selected from the group consisting of alkyl group, alkylamine group, alkenyl group and aryl group having 1 to 20 carbons, independently, among which at least one is an alkoxy alkyl group expressed by $CH_3$—$(CH_2)p$-$O(CH_2)q$, where p is an integer of 0 to 8 and q is an integer of 1 to 8, and where X is any one selected from the group consisting of carbon, silicon, oxygen, nitrogen, phosphorus, sulfur and hydrogen, wherein i) m is 0 (zero) when X is hydrogen, ii) m is 1 when X is oxygen or sulfur, iii) m is 2 when X is nitrogen or phosphorus, and iv) m is 3 when X is carbon or silicon.

Chemistry Figure 2

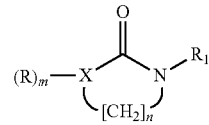

where R and $R_1$ are hydrogen, or any one selected from the group consisting of alkyl group, alkylamine group, alkenyl group, aryl group and allyl group having 1 to 20 carbons, independently, among which at least one is an alkoxy alkyl group expressed by $CH_3$—$(CH_2)p$-$O(CH_2)q$, where p is an integer of 0 to 8 and q is an integer of 1 to 8, where X is any one selected from the group consisting of carbon, silicon, oxygen, nitrogen, phosphorus and sulfur, wherein i) m is 0 (zero) when X is oxygen or sulfur, ii) m is 1 when X is nitrogen or phosphorus, and iii) m is 2 when X is carbon or silicon, and where n is an integer of 1 to 10.

In the electrolyte of the present invention, the alkoxy alkyl group-containing amide compound may be N-methoxyethyl methylcarbamate, N-methoxyethyl-N-methyl methylcarbamate, N-methoxymethyl-N-methyl methylcarbamate, N,N-dimethyl methoxy ethyl carbamate, N-methyl-N-methoxyethyl methoxyethyl carbamate, N-methyl-N-methoxyethyl methoxymethyl carbamate, N-methoxyethyl caprolactam or N-methoxyethyl oxazolidinone.

Also, in the electrolyte of the present invention, an anion of the lithium salt may be $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ or $(CF_3CF_2SO_2)_2N^-$.

In the electrolyte of the present invention, the eutectic mixture preferably contains the alkoxy alkyl group-containing compound and the lithium salt at a mole ratio of 1~8:1.

The electrolyte of the present invention may be usefully applied to electrochemical devices such as lithium secondary batteries.

Advantageous Effects

The electrolyte according to the present invention gives the following effects.

First, since the new eutectic mixture included in the electrolyte of the present invention exhibits inherent characteristics of the eutectic mixture such as excellent thermal stability and excellent chemical stability, the conventional problems of electrolyte solution such as evaporation, ignition and side reaction, caused by the usage of existing organic solvents, may be greatly solved.

Second, the eutectic mixture included in the electrolyte of the present invention exhibits a smaller lowest limit of the electrochemical window, so the electrolyte may be usefully applied to electrochemical devices that require various electrochemical characteristics.

Third, the eutectic mixture included in the electrolyte of the present invention exhibits better high temperature stability, thereby contributing to improvement of high temperature stability of an electrochemical device.

BEST MODE FOR CARRYING OUT THE INVENTION

Hereinafter, preferred embodiments of the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

An electrolyte according to the present invention includes a eutectic mixture composed of (a) an alkoxy alkyl group-containing amide compound expressed by the following chemistry formula 1 or 2; and (b) an ionizable lithium salt.

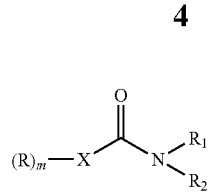

Figure 1:
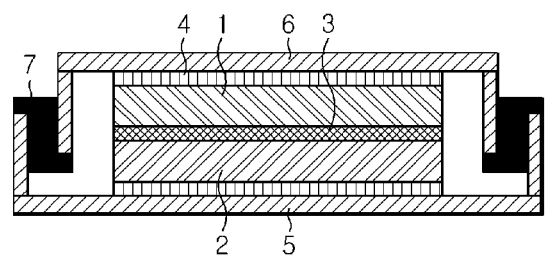
FIG. 1 is a schematic sectional view showing a coin-type secondary battery.

Chemistry Figure 1 where R, $R_1$ and $R_2$ are hydrogen, halogen or any one selected from the group consisting of alkyl group, alkylamine group, alkenyl group and aryl group having 1 to 20 carbons, independently, among which at least one is an alkoxy alkyl group expressed by $CH_3$—$(CH_2)p$-$O(CH_2)q$, where p is an integer of 0 to 8 and q is an integer of 1 to 8; and where X is any one selected from the group consisting of carbon, silicon, oxygen, nitrogen, phosphorus, sulfur and hydrogen, wherein i) m is 0 (zero) when X is hydrogen, ii) m is 1 when X is oxygen or sulfur, iii) m is 2 when X is nitrogen or phosphorus, and iv) m is 3 when X is carbon or silicon.

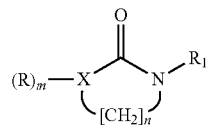

Figure 2:
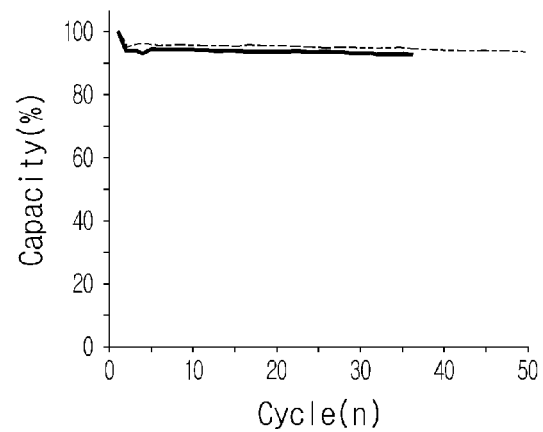
FIG. 2 is a graph showing charging/discharging efficiency of secondary batteries according to an example 5 and a comparative example 4.

Chemistry Figure 2 where R and $R_1$ are hydrogen, or any one selected from the group consisting of alkyl group, alkylamine group, alkenyl group, aryl group and allyl group having 1 to 20 carbons, independently, among which at least one is an alkoxy alkyl group expressed by $CH_3$—$(CH_2)p$-$O(CH_2)q$, where p is an integer of 0 to 8 and q is an integer of 1 to 8;

where X is any one selected from the group consisting of carbon, silicon, oxygen, nitrogen, phosphorus and sulfur, wherein i) m is 0 (zero) when X is oxygen or sulfur, ii) m is 1 when X is nitrogen or phosphorus, and iii) m is 2 when X is carbon or silicon; and where n is an integer of 1 to 10.

Electrochemical devices generate much heat in use or are frequently exposed to high temperature, so stability at high temperature is a very important factor.

The inventors formed a eutectic mixture using the alkoxy alkyl group-containing amide compound, mentioned above, together with a lithium salt. This eutectic mixture exhibits high thermal and chemical stabilities, differently from existing non-aqueous electrolyte organic solvent, and the thermal and chemical stabilities of the above eutectic mixture were superior to those of a eutectic mixture of lithium salt and amide-based compound like methyl carbamate. Also, the eutectic mixture of lithium salt and alkoxy alkyl group-containing amide compound according to the present invention exhibits a smaller lowest limit of an electrochemical window. Accordingly, the eutectic mixture of lithium salt and alkoxy alkyl group-containing amide compound according to the present invention contributes to improvement of high temperature stability of electrochemical devices, and they may be usefully applied as electrolyte of electrochemical devices having various anode materials.

In the electrolyte of the present invention, the alkoxy alkyl group-containing amide compound of the eutectic mixture may be N-methoxyethyl methylcarbamate, N-methoxyethyl-N-methyl methylcarbamate, N-methoxymethyl-N-methyl methylcarbamate, N,N-dimethyl methoxy ethyl carbamate, N-methyl-N-methoxyethyl methoxyethyl carbamate, N-methyl-N-methoxyethyl methoxymethyl carbamate, N-methoxyethyl caprolactam, N-methoxyethyl oxazolidinone, and so on.

In addition, in the electrolyte of the present invention, the lithium salt that configures the eutectic mixture together with the alkoxy alkyl group-containing amide compound is an ionizable lithium salt, which may be expressed as $Li^+X^-$. This lithium salt may have an anion such as $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, though not limited thereto.

In the electrolyte of the present invention, the eutectic mixture has a melt temperature that may be varied depending on R, $R_1$ and 1 of the chemistry FIG. 1, but preferably the eutectic mixture exists in a liquid state at a normal temperature (25° C.). Also, the eutectic mixture preferably has a viscosity of 200 cP or less, though not limited thereto.

In the electrolyte of the present invention, the eutectic mixture may be prepared in a common way well known in the art. For example, the eutectic mixture may be obtained by mixing the alkoxy alkyl group-containing amide compound with a lithium salt at a normal temperature, and reacting and then purifying the mixture at a suitable temperature not higher than 70° C. At this time, in the prepared eutectic mixture, the alkoxy alkyl group-containing amide compound and the lithium salt are preferably included at a mole ratio of 1~8:1, more preferably 2~6:1.

The electrolyte of the present invention includes the eutectic mixture having lithium ions in itself, so lithium ion may not be separately added thereto even when the electrolyte is applied to a lithium secondary battery. However, the electrolyte of the present invention may further include a salt such as lithium salt at a concentration of 0 to 1 M/L, for example. In case lithium salt is further included in the electrolyte, it is preferred to use a lithium salt having the same anion as that of the lithium salt included in the eutectic mixture in order to improve solubility in the electrolyte.

In addition, it would be apparent to those having ordinary skill in the art that various kinds of additives or organic solvents may be further included in the electrolyte of the present invention if they do not deteriorate the inherent effects of the present invention.

The electrolyte of the present invention may use all kinds of electrolytes regardless of their forms, for example liquid electrolyte and solid or gel-type polymer electrolyte made of polymer itself. In case a liquid electrolyte is applied as the electrolyte of the present invention, the eutectic mixture may be used in single or in combination with salt, organic solvent, additive and so on. Meanwhile, in case the electrolyte of the present invention is a polymer electrolyte, the electrolyte may be a gel-type polymer electrolyte formed by polymerization of the eutectic compound and a precursor solution containing a monomer that may form a polymer by polymerization reaction, or the electrolyte may be prepared as a polymer electrolyte where the eutectic mixture is impregnated in a solid or gel-type polymer.

① First, the gel-type polymer electrolyte prepared by polymerization of a precursor solution is explained.

The gel-type polymer electrolyte according to one aspect of the present invention may be formed by polymerizing (i) the eutectic mixture of alkoxy alkyl group-containing amide compound and ionizable lithium salt, expressed by the above chemistry FIG. 1 or; (ii) a precursor solution containing a monomer that may form a polymer by polymerization.

The monomer may use all kinds of monomers that may form a gel polymer together with the eutectic mixture while polymerization reaction progresses, and it may be a vinyl monomer, but not limited thereto. The vinyl monomer allows very simple polymerization when it is mixed with the eutectic mixture to form a gel polymer The vinyl monomer may be acrylonitrile, methylmethacrylate, methylacrylate, methacrylonitrile, methylstyrene, vinylester, vinyl chloride, vinylidene chloride, acrylamide, tetrafluoroethylene, vinylacetate, methylvinylketone, ethylene, styrene, paramethoxystyrene and paracyanostyrene, or their mixtures, but not limitedly.

The precursor solution may additionally include common polymerization initiators or photo initiators. The initiator is decomposed by heat or UV rays to form radicals, and then forms a gel polymer electrolyte by reacting with the monomer by free radical polymerization. In addition, the monomer may also be polymerized without using an initiator. Generally, the free radical polymerization goes through an initiation reaction by which temporary molecules or active sites with strong reactivity are formed, a propagation reaction by which a monomer is added to an activation chain terminal to form an active site at the end of the chain, a chain transfer reaction by which the active sites are transferred to other molecules, and a termination reaction by which the activation chain center is destroyed.

Allowable thermal polymerization initiators may be organic peroxides or hydroperoxides such as benzoyl peroxide, acetyl peroxide, dilauryl peroxide, di-tert-butyl peroxide, cumyl hydroperoxide and hydrogen peroxide; azo compounds such as 2,2-azobis(2-cyanobutane), 2,2-azobis(methylbutyronitrile), AIBN (azobis(iso-butyronitrile) and AMVN (azobisdimethyl-valeronitrile); organic metals such as alkylated silvers; and so on, but not limitedly. Also, the photo initiator that forms radicals by light such as UV rays may be chloroacetophenone, diethoxy acetophenone (DEAP), 1-phenyl-2-hydroxy-2-methyl propaneone (HMPP), 1-hydroxy cyclohexyl phenyl ketone, α-amino acetophenone, benzoin ether, benzyl dimethyl ketal, benzophenone, thioxanthone, 2-ethylanthraquinone (2-ETAQ) and so on.

In addition to the above components, the precursor solution of the gel polymer electrolyte employed in the present invention may selectively contain other additives well known in the art.

The above precursor solution is used to form a gel polymer electrolyte in a common way well known in the art. At this time, the gel polymer electrolyte is preferably prepared by means of in-situ polymerization reaction in an electrochemical device. The in-situ polymerization reaction may be conducted using heat or UV irradiation. A content ratio of the eutectic mixture and the monomer in the precursor solution is preferably controlled to 0.5~0.95:0.05~0.5. The degree of polymerization of the gel polymer may be adjusted depending on reaction factors such as polymerization time, polymerization temperature and amount of irradiated light, so the degree of polymerization is controlled such that polymer is not over-polymerized to shrink its volume without any leakage of electrolyte.

② As another method for preparing a polymer electrolyte including an eutectic mixture according to the present invention, it is possible to inject an eutectic mixture to a previously prepared solid or gel polymer such that the eutectic mixture is impregnated in the polymer.

Available polymers include polymethylmethacrylate, polyvinylidene difluoride, polyvinyl chloride, polyethylene oxide and polyhydroxyethylmethacrylate, which may be used in single or in mixture, but not limitedly. This method may be simplified using the above in-situ polymerization.

③ As another method for preparing a polymer electrolyte including an eutectic mixture according to the present invention, it is also possible to dissolve a polymer and an eutectic mixture in a solvent and then eliminating the solvent to form a polymer electrolyte. At this time, the eutectic mixture is in a state of being contained in a polymer matrix.

Available solvents are not specially limited, but the solvent may be toluene, acetone, acetonitrile, THF and so on. Also, the solvent may be eliminated in various ways such as heating, without special limitations.

The electrolyte including a eutectic mixture according to the present invention may be applied to common electrochemical devices well known in the art, which need various electrochemical characteristics according to their usages.

The electrochemical devices may be all kinds of primary batteries, secondary batteries, fuel cells, solar cells, electrochromic devices, electrolyte condensers, and capacitors, and they may be more specifically lithium secondary batteries, electric double-layer capacitors, dye-sensitized solar cells and electrochromic devices.

MODE FOR THE INVENTION

Hereinafter, various preferred examples of the present invention will be described in detail for better understandings. However, the examples of the present invention may be modified in various ways, and they should not be interpreted as limiting the scope of the invention. The examples of the present invention are just for better understandings of the invention to persons having ordinary skill in the art.

Example 1

5.8 g of N-methoxyethyl-N-methyl methylcarbamate and 2 g of $LiPF_6$ were put into a round bottom flask and slowly stirred for 2 hours under a nitrogen circumstance, thereby obtaining 7.8 g of a desired eutectic mixture.

Example 2

5.2 g of N-methoxyethyl methylcarbamate and 2 g of $LiPF_6$ were put into a round bottom flask and slowly stirred for 2 hours under a nitrogen circumstance, thereby obtaining 7.2 g of a desired eutectic mixture.

Example 3

7.5 g of N-methoxyethyl-N-methyl methoxyethyl carbamate and 2 g of $LiPF_6$ were put into a round bottom flask and slowly stirred for 2 hours under a nitrogen circumstance, thereby obtaining 9.5 g of a desired eutectic mixture.

Example 4

5.3 g of N-methoxyethyl oxazolidinone and 2 g of $LiPF_6$ were put into a round bottom flask and slowly stirred for 2 hours under a nitrogen circumstance, thereby obtaining 7.3 g of a desired eutectic mixture.

Comparative Example 1

4.7 g of purified methylcarbamate and 6 g of LiTFSI were put into a round bottom flask and slowly stirred for 2 hours at a room temperature under a nitrogen circumstance, thereby obtaining 10.7 g of a eutectic mixture.

Comparative Example 2

3.8 g of purified acetamide and 6 g of LiTFSI were put into a round bottom flask and slowly stirred for 2 hours under a nitrogen circumstance, thereby obtaining 9.8 g of a eutectic mixture.

Comparative Example 3

5.3 g of oxazolidinone and 2 g of $LiPF_6$ were put into a round bottom flask and slowly stirred for 2 hours at a room temperature under a nitrogen circumstance, thereby obtaining 7.3 g of a eutectic mixture.

In order to evaluate properties of the eutectic mixtures prepared according to the above examples and the comparative examples, the following test was executed.

As test pieces, the eutectic mixture composed of an amide compound corresponding to the chemistry FIG. 1 according to the example 1 and the eutectic mixtures according to the comparative examples 1 and 2 were used. At this time, a ratio of amide compound and salt in the used eutectic mixture was 3:1. Viscosity was measured using a RS150 viscometer, and conductivity was measured using Inolab 740.

The test results are shown in the following table 1. Seeing the test results in the table 1, it would be understood that the eutectic mixture composed of the amide compound containing an alkoxy alkyl group according to the example 1 exhibits improved reduction stability.

TABLE 1

| Ð | Viscosity | Conductivity | Electrochemical Window |
|---|---|---|---|
| Example 1 | 82 | 1.2 | 0.45~4.5 |
| Comparative Example 1 | 62 | 1.7 | 0.6~4.7 |
| Comparative Example 2 | 100 | 1.1 | 0.7~4.9 |

In addition, electrochemical windows were measured for the eutectic mixture composed of an amide compound corresponding to the chemistry FIG. 2 according to the example 4 and the eutectic mixture according to the comparative example 3. The measurement results are shown in the following table 2. Seeing the table 2, it would be understood that the eutectic mixture of the example 3 exhibits improved reduction stability.

TABLE 2

| Ð | Electrochemical Window |
|---|---|
| Example 4 | 0.8~4.7 |
| Comparative Example 3 | 1.1~4.8 |

Manufacture of Battery

Example 5

Preparation of Cathode $LiCoO_2$ as a cathode active material, artificial graphite as conductive material, and polyvinylidene fluoride as a binder were mixed at a weight ratio of 94:3:3, and then N-methylpyrrolidone was applied to the obtained mixture to make slurry.

The prepared slurry was applied to an aluminum foil and then dried at 130° C. for 2 hours, thereby making a cathode.

Preparation of Anode

Anode active material, artificial graphite as conductive material, and a binder were mixed at a weight ratio of 94:3:3, and then N-methylpyrrolidone was applied to the obtained mixture to make slurry. The prepared slurry was applied to a copper foil and then dried at 130° C. for 2 hours, thereby making an anode.

Assembling of Secondary Battery

The made cathode and anode were prepared to have a size of 1 cm², and a separator was interposed between them. The eutectic mixture prepared in the example 1 was injected thereto, thereby making a secondary battery as shown in FIG. 1. In FIG. 1, reference numeral 1 designates a cathode, 2 designates an anode, 3 designates separator and electrolyte, 4 designates a spacer, 5 designates a coin can container, 6 designates a coil can cover, and 7 designates a seaming rubber.

Example 6

2.3 g of the eutectic mixture prepared in the example 1 was injected to a commercial pouch-type battery in which a separator is interposed between a cathode and an anode as mentioned above, thereby making a secondary battery.

Comparative Example 4

A secondary battery was made in the same way as the example 5, except that 1M $LiPF_6$ containing ethylene carbonate and ethylmethyl carbonate at a volume ratio of 1:2 was used as electrolyte instead of the eutectic mixture of the example 1.

Comparative Example 5

A secondary battery was made in the same way as the example 6, except that the eutectic mixture of the comparative example 1 was used as electrolyte instead of the eutectic mixture of the example 1.

Evaluation of Normal Temperature Performance of Secondary Battery

The secondary batteries prepared according to the example 5 and the comparative example 4 were respectively charged/discharged by 0.5 $mAcm^{-2}$, and discharge capacity and charging/discharging efficiency were measured according to cycles. As a result of the experiment, it was found that both of the battery using the electrolyte containing a common carbonate-based solvent according to the comparative example 4 and the battery using the eutectic mixture of the present invention as electrolyte according to the example 5 exhibit 90% or more discharge capacity and 99% of charging/discharging efficiency after thirtieth cycles. In FIG. 2, a solid line corresponds to the example 5, and a dotted line corresponds to the comparative example 4. From FIG. 2, it might be understood that the eutectic mixture electrolyte of the present invention may give performance equivalent to conventional commercialized liquid electrolytes.

High Temperature Stability Experiment of Secondary Battery

The pouch-type secondary batteries prepared according to the example 6 and the comparative example 5 were charged to 4.2V, and then left alone at 90° C. for 4 hours, and the change of thickness of the batteries were measured. The experimental results are shown in the following table 3.

TABLE 3

| Ð | Initial Thickness (mm) | Later Thickness (mm) | Increment (%) |
|---|---|---|---|
| Example 6 | 3.86 | 3.90 | 1.0% |
| Comparative Example 5 | 3.85 | 4.43 | 15.0% |

Seeing the table 3, it would be understood that the battery using the eutectic mixture of the present invention according to the example 6 exhibits more excellent high temperature stability than the battery using a conventional eutectic mixture according to the comparative example 5.

The invention claimed is:

1. An electrolyte, comprising a eutectic mixture comprising:
   (a) an alkoxy alkyl group-containing amide compound expressed by the following Chemistry FIG. 1 or 2; and
   (b) an ionizable lithium salt,
   wherein the eutectic mixture contains the alkoxy alkyl group-containing compound and the lithium salt at a mole ratio of 1:1 to 8:1,

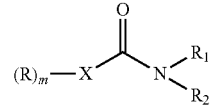

Chemistry Figure 1 wherein $R_1$ is an alkoxy alkyl group expressed by $CH_3-(CH_2)p-O(CH_2)q$, where p is an integer of 0 to 8 and q is an integer of 1 to 8, wherein $R_2$ is hydrogen, halogen or any one selected from the group consisting of alkyl group, alkylamine group, alkenyl group and aryl group having 1 to 20 carbons, independently, among which at least one is an alkoxy alkyl group expressed by $CH_3-(CH_2)p-O(CH_2)q$, where p is an integer of 0 to 8 and q is an integer of 1 to 8, wherein R is hydrogen, halogen or any one selected from the group consisting of alkyl group, alkylamine group, alkenyl group and aryl group having 1 to 20 carbons, and wherein X is any one selected from the group consisting of carbon, silicon, oxygen, phosphorus, sulfur and hydrogen, wherein i) m is 0 when X is hydrogen, ii) m is 1 when X is oxygen or sulfur, iii) m is 2 when X is phosphorus, and iv) m is 3 when X is carbon or silicon;

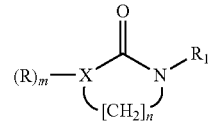

Chemistry Figure 2 wherein R is hydrogen, or any one selected from the group consisting of alkyl group, alkylamine group, alkenyl group, aryl group and allyl group having 1 to 20 carbons, wherein $R_1$ is an alkoxy alkyl group expressed by $CH_3-(CH_2)p-O(CH_2)q$, where p is an integer of 0 to 8 and q is an integer of 1 to 8, wherein X is any one selected from the group consisting of carbon, silicon, oxygen, phosphorus and sulfur, wherein i) m is 0 when X is oxygen or sulfur, ii) m is 1 when X is phosphorus, and iii) m is 2 when X is carbon or silicon, and where n is an integer of 1 to 10, and wherein the eutectic mixture has a viscosity of 200 cP or less.

2. The electrolyte according to claim 1, wherein the alkoxy alkyl group-containing amide compound is any one selected from the group consisting of N-methoxyethyl methylcarbamate, N-methoxyethyl-N-methyl methylcarbamate, N-methoxymethyl-N-methyl methylcarbamate, N methyl-N-methoxyethyl methoxymethyl carbamate, N-methoxyethyl caprolactam and N-methoxyethyl oxazolidinone.

3. The electrolyte according to claim 1, wherein an anion of the lithium salt is any one selected from the group consisting of F—, Cl—, Br—, I—, NO3-, N(CN)2-, BF4-, ClO4-, PF6-, (CF3)2PF4-, (CF3)3PF3-, (CF3)4PF2-, (CF3)5PF—, (CF3)6P—, CF3SO3-, CF3CF2SO3-, (CF3SO2)2N—, (FSO2)2N—, CF3CF2(CF3)2CO—, (CF3SO2)2CH—, (SF5)3C—, (CF3SO2)3C—, CF3(CF2)7SO3-, CF3CO2-, CH3CO2-, SCN— and (CF3CF2SO2)2N—.

4. The electrolyte according to claim 1, wherein an anion of the lithium salt is identical to an anion of the ionizable lithium salt in the eutectic mixture.

5. The electrolyte according to claim 1, wherein the electrolyte is a polymer electrolyte.

6. The electrolyte according to claim 5, wherein the polymer electrolyte is a gel-type polymer electrolyte formed by polymerization of (i) the eutectic compound, and (ii) a precursor solution containing a monomer that forms a polymer by polymerization reaction.

7. The electrolyte according to claim 6, wherein the monomer is a vinyl monomer.

8. The electrolyte according to claim 7, wherein the vinyl monomer is any one selected from the group consisting of acrylonitrile, methylmethacrylate, methylacrylate, methacrylonitrile, methylstyrene, vinylester, vinyl chloride, vinylidene chloride, acrylamide, tetrafluoroethylene, vinylacetate, methylvinylketone, ethylene, styrene, paramethoxystyrene and paracyanostyrene, or their mixtures.

9. The electrolyte according to claim 6, wherein a content ratio of the eutectic mixture and the monomer in the precursor solution is 0.5~0.95:0.05~0.5.

10. The electrolyte according to claim 6, wherein the gel-type polymer electrolyte is obtained by in-situ polymerization in an electrochemical device.

11. The electrolyte according to claim 5, wherein the polymer electrolyte is obtained by impregnating the eutectic mixture in a polymer.

12. The electrolyte according to claim 11, wherein the polymer is any one selected from the group consisting of polymethylmethacrylate, polyvinylidene difluoride, polyvinyl chloride, polyethylene oxide and polyhydroxyethylmethacrylate, or their mixtures.

13. An electrochemical device, comprising a cathode, an anode and the electrolyte of claim 1.

14. The electrochemical device according to claim 13, wherein the electrochemical device is a lithium secondary battery.

* * * * *